US008288447B2

(12) United States Patent
Muenz et al.

(10) Patent No.: US 8,288,447 B2
(45) Date of Patent: Oct. 16, 2012

(54) FOAMABLE COMPOSITIONS BASED ON EPOXY RESINS AND POLYESTERS

(75) Inventors: Xaver Muenz, Heidelberg (DE); Bernd Mayer, Heidelberg (DE); Christian Scheffner, Eppelhelm (DE); Rajat K. Agarwal, Duesseldorf (DE); Michael S. Puckett, Holly, MI (US); Gregory A. Ferguson, Harrison Township, MI (US); Olaf Lammerschop, Krefeld (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 668 days.

(21) Appl. No.: 12/329,725

(22) Filed: Dec. 8, 2008

(65) Prior Publication Data

US 2009/0176903 A1 Jul. 9, 2009

Related U.S. Application Data

(63) Continuation of application No. PCT/US2007/070398, filed on Jun. 5, 2007.

(60) Provisional application No. 60/811,599, filed on Jun. 7, 2006.

(51) Int. Cl.
C08J 9/32 (2006.01)
C08L 63/00 (2006.01)

(52) U.S. Cl. ............ 521/97; 521/98; 521/138; 521/178

(58) Field of Classification Search ............... 521/97, 521/98, 138, 178
See application file for complete search history.

(56) References Cited

U.S. PATENT DOCUMENTS

| | | |
|---|---|---|
| 3,252,923 A | 5/1966 | Sagado |
| 3,756,984 A | 9/1973 | Klaren et al. |
| 4,066,625 A | 1/1978 | Bolger |
| 4,268,656 A | 5/1981 | Ray-Chaudhuri et al. |
| 4,360,649 A | 11/1982 | Kamio et al. |
| 4,444,818 A | 4/1984 | Tominaga et al. |
| 4,542,202 A | 9/1985 | Takeuchi et al. |
| 4,546,155 A | 10/1985 | Hirose et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,134,221 A | 7/1992 | Lavalette |
| 5,134,239 A | 7/1992 | Bertram et al. |
| 5,290,857 A | 3/1994 | Ashida et al. |
| 5,407,978 A | 4/1995 | Bymark et al. |
| 5,430,112 A | 7/1995 | Sakata et al. |
| 5,439,977 A | 8/1995 | Yokota et al. |
| 5,464,910 A | 11/1995 | Nakatsuka et al. |
| 5,543,486 A | 8/1996 | Abe et al. |
| 5,548,058 A | 8/1996 | Muroi et al. |
| 5,561,213 A | 10/1996 | Poessnecker |
| 5,575,526 A | 11/1996 | Wycech |
| 5,717,011 A | 2/1998 | Griggs |
| 5,731,390 A | 3/1998 | van Helmond |
| 5,733,954 A | 3/1998 | McKenzie et al. |
| 5,755,486 A | 5/1998 | Wycech |
| 5,767,226 A | 6/1998 | Kinkelin et al. |
| 5,789,498 A | 8/1998 | Ohnishi et al. |
| 5,798,399 A | 8/1998 | Griggs et al. |
| 5,801,218 A | 9/1998 | McKenzie et al. |
| 5,869,594 A | 2/1999 | Kinkelin |
| 5,884,960 A | 3/1999 | Wycech |
| 5,888,600 A | 3/1999 | Wycech |
| 6,058,673 A | 5/2000 | Wycech |
| 6,068,424 A | 5/2000 | Wycech |
| 6,096,403 A | 8/2000 | Wycech |
| 6,103,784 A | 8/2000 | Hilborn et al. |
| 6,165,588 A | 12/2000 | Wycech |
| 6,168,226 B1 | 1/2001 | Wycech |
| 6,218,442 B1 | 4/2001 | Hilborn et al. |
| 6,237,304 B1 | 5/2001 | Wycech |
| 6,255,443 B1 | 7/2001 | Kinkelin et al. |
| 6,270,600 B1 | 8/2001 | Wycech |
| 6,287,666 B1 | 9/2001 | Wycech |

(Continued)

FOREIGN PATENT DOCUMENTS

CA 2241073 A1 12/1999

(Continued)

OTHER PUBLICATIONS

International Search Report dated Nov. 13, 2007, International Application PCT/US2007/070398.

(Continued)

*Primary Examiner* — Irina S Zemel

(74) *Attorney, Agent, or Firm* — Mary K. Cameron

(57) ABSTRACT

Expandable, thermally curable compositions containing at least one epoxy resin, at least one polyester, at least one blowing agent, and at least one curing agent are useful as adhesives and structural reinforcement materials. When foamed and adhered to a metal substrate surface, such polyester-modified foamable compositions can exhibit improved adhesion to the substrate surface after exposure to a corrosive environment, as compared to compositions that do not contain polyester. Furthermore, these compositions can exhibit improved flow properties in the uncured state at temperatures between 50 and 100° C. They are granulatable, with the granules produced thereby having non-tacky surfaces at room temperature and being capable of being readily processed into molded objects by injection molding processes.

22 Claims, No Drawings

U.S. PATENT DOCUMENTS

| | | |
|---|---|---|
| 6,332,731 B1 | 12/2001 | Wycech |
| 6,341,467 B1 | 1/2002 | Wycech |
| 6,348,513 B1 | 2/2002 | Hilborn et al. |
| 6,376,564 B1 | 4/2002 | Harrison |
| 6,403,222 B1 | 6/2002 | Harrison |
| 6,406,078 B1 | 6/2002 | Wycech |
| H2047 H | 9/2002 | Harrison et al. |
| 6,451,231 B1 | 9/2002 | Harrison et al. |
| 6,455,126 B1 | 9/2002 | Wycech |
| 6,482,496 B1 | 11/2002 | Wycech |
| 6,573,309 B1 | 6/2003 | Reitenbach et al. |
| 6,776,869 B1 | 8/2004 | Schenkel |
| 6,863,957 B2 | 3/2005 | Wycech |
| 6,865,811 B2 | 3/2005 | Wycech |
| 2004/0221953 A1 | 11/2004 | Czaplicki et al. |
| 2004/0266898 A1 | 12/2004 | Kassa et al. |
| 2004/0266899 A1 | 12/2004 | Muenz et al. |
| 2005/0159531 A1 | 7/2005 | Ferng et al. |
| 2006/0188726 A1 | 8/2006 | Muenz et al. |

FOREIGN PATENT DOCUMENTS

| | | |
|---|---|---|
| CA | 2359054 A1 | 7/2000 |
| DE | 2722752 A1 | 11/1978 |
| EP | 0030590 A1 | 6/1981 |
| EP | 0030999 A2 | 7/1981 |
| EP | 0230666 A2 | 8/1987 |
| EP | 0297036 A1 | 12/1988 |
| EP | 0298024 A1 | 1/1989 |
| EP | 0376880 A2 | 7/1990 |
| EP | 0798062 A2 | 10/1997 |
| EP | 0950677 B1 | 10/2005 |
| EP | 1602702 A1 | 12/2005 |
| EP | 1500690 B1 | 7/2006 |
| JP | 59 053526 A | 3/1984 |
| JP | 11-302516 A | 11/1999 |
| JP | 2005-232375 A | 9/2005 |
| WO | WO 89/08678 A1 | 9/1989 |
| WO | WO 93/00381 A1 | 1/1993 |
| WO | WO 95/27000 A1 | 10/1995 |
| WO | WO 96/15594 A1 | 4/1996 |
| WO | WO 96/37400 A1 | 11/1996 |
| WO | WO 00/27920 A1 | 5/2000 |
| WO | WO 00/52086 A2 | 9/2000 |
| WO | WO03054069 | 7/2003 |
| WO | WO 2004/065485 A1 | 8/2004 |

OTHER PUBLICATIONS

Written Opinion dated Nov. 13, 2007, International Application PCT/US2007/070398.

Lilli Manolis Sherman, "Close Up on Technology: Additives Nanoscale Additive Blends Both Compatibilize and Toughen", Gardner Publications, Inc., Plastics Technology, Jan. 2006.

"Epoxy Resins", Encyclopedia of Polymer Science and Engineering, $2^{nd}$ Edition, (1986), vol. 6, pp. 322-332, John Wiley & Sons.

European Search Report for EP07784320, dated Jun. 8, 2012, 3 pages.

FOAMABLE COMPOSITIONS BASED ON EPOXY RESINS AND POLYESTERS

This application is a continuation under 35 U.S.C. Sections 365(c) and 120 of International Application No. PCT/US20071070398, filed Jun. 5, 2007 and published on Dec. 13, 2007 as WO 2007/143646, which claims priority from U.S. Provisional Patent Application Ser. No. 60/811,599 filed Jun. 7, 2006, which are incorporated herein by reference in their entirety.

FIELD OF THE INVENTION

Discussion of the Related Art

It is known that a number of industries, e.g., the automobile industry, require parts that are both strong and light-weight. One attempt to achieve this balance between strength and minimal weight provides for hollow metal parts. However, hollow metal parts are easily distorted. Accordingly, it is also known that the presence of structural foam in the cavities of the hollow parts can improve strength and stiffness of such parts. Similarly, for flat components of automobile bodies, such as doors, roof components, engine hoods or trunk lids it is also known to increase the stiffness and strength of these parts by applying layered laminates based on expandable or non-expandable epoxy resins or polyurethane resins onto these parts and bonding them solidly together.

Such foams may comprise a thermosettable resin such as an epoxy resin, a blowing agent and a filler such as hollow glass microspheres. Preferably, these foams have a density of about 20-40 lb/ft$^3$ (about 0.30-0.80 g/cc) and are able to withstand heat in excess of 175 degrees C., most preferably in excess of 200 degrees C. Optional ingredients include curatives, processing aids, stabilizers, colorants, and UV absorbers.

Specific formulas for structural foam can vary widely. For example, expandable epoxy resin-based compositions useful in the field of structural reinforcement and stiffening are described in the following United States patents and applications, each of which is incorporated herein by reference in its entirety: U.S. Pat. Nos. 5,575,526; 5,755,486; 6,403,222; 6,376,564; 6,348,513; 6,218,442; 6,103,784; 6,573,309; 2004-0266899; and 2006-188726.

One characteristic of structural reinforcement foams is that they start as expandable resins that form gas pockets (cells) when cured. When exposed to ordinary environmental conditions, these cells can trap salt and water. Salt and water corrode the metal parts, which are commonly in contact with the foam, and the resulting metal oxide degrades the ability of the foam to adhere to the metal. Eventually, the foam separates from the metal part, thereby weakening the part. It would therefore be desirable to develop new structural reinforcement foams that have improved resistance to such corrosive conditions.

Today, three dimensional structural foam parts are usually manufactured by injection molding processes. Due to the stickiness of the materials at temperatures above 30° C., the starting material for manufacturing the part by injection molding cannot be used in granular form. To be able nevertheless to manufacture parts by this process, costly modifications to the material feed of the injection molding machine have to be made. A special feeding system is required and hence it is not possible to manufacture parts on all commercially available injection molding machines.

If formulations with a higher melting point are employed in order to increase the softening point to ca. 40° C., then the structural foam part has to be processed in the injection molding machine at higher temperatures in order to fill the molds. Temperatures above 95° C. are not possible, as then the curing reaction of the composition would be initiated and this could lead to a blockage of the machine.

Bearing in mind the problems recognized in the field, the inventors have endeavored to develop foamable compositions for manufacturing molded objects for reinforcing and/or strengthening sheet metal or metallic hollow objects, which
- are not sticky (i.e., are non-tacky) up to 45° C.;
- allow a favorable packaging;
- are granulatable;
- afford dimensionally stable parts;
- exhibit no decrease in the mechanical properties in comparison with previously known compositions;
- show good corrosion resistance when the molded object is foamed, cured and adhered to a metal surface; and/or
- enable the use of standard injection molding machines for the molding process.

SUMMARY OF THE INVENTION

Surprisingly, we have now found that polyesters can act as corrosion inhibitors when added to structural reinforcement foam formulations. That is, the presence of a polyester reduces the amount of corrosion which takes place on a metal surface (particularly a ferrous metal-containing surface such as steel) in contact with a reinforcing foam. A polyester-modified foam which is adhered to such a surface can exhibit significantly increased adhesive strength after exposure to corrosive environmental conditions (e.g., exposure to salt water and/or humidity), as compared to a foam that does not contain any polyester. The incorporation of a polyester into a foamable composition also has the further unexpected advantage of providing a foamable composition that can be readily pelletized, has a non-tacky surface at temperatures up to 45 degrees C., and can be injection molded into a desired dimensionally stable shape or configuration using conventional machinery.

The foamable compositions can comprise, in addition to one or more polyesters, one or more epoxy resins, one or more curatives, and one or more blowing agents. The foamable composition can additionally contain one or more fillers, particularly hollow glass microspheres, glass fibers, and/or micaceous fillers.

In one embodiment of the invention, the foamable composition comprises one or more epoxy resins; one or more curatives; one or more blowing agents; and one or more polyesters.

In one embodiment of the foamable composition, the one or more polyesters are present in an amount effective to reduce corrosion when a foam obtained from the foamable composition is in contact with a metal surface as compared to a foam obtained from an analogous foamable composition not containing any of the polyesters.

In one embodiment of the foamable composition, the at least one of the one or more polyesters is solid at room temperature. In one embodiment, the at least one of the one or more polyesters has a melting point between 50° C. and 100° C. Desirably, at least one of the one or more polyesters has a melting point between 50° C. and 80° C.

In one embodiment of the foamable composition, at least one of the one or more polyesters is amorphous, partially crystalline or crystalline at room temperature.

In one embodiment of the foamable composition, at least one of the one or more polyesters contains hydroxyl groups. In one embodiment, the foamable composition comprises at least one polyester polyol. In one embodiment, the foamable composition comprises at least one crystalline polyester polyol.

In one embodiment, the foamable composition comprises at least one polyester having a number average molecular weight of from about 400 to about 20,000. Desirably, the at least one polyester has a number average molecular weight of from about 1000 to about 6000.

In one embodiment of the foamable composition, the polyesters are present in an amount totaling from about 0.1 weight % to about 10 weight % based on the overall weight of the foamable composition. Desirably, the polyesters are present in an amount totaling from about 1 to about 8 weight %.

In one embodiment of the foamable composition, at least one of the epoxy resins is a glycidyl ether of a polyhydric phenol. Desirably, the at least one of the epoxy resins is a glycidyl ether of bis-phenol A.

In one embodiment, the foamable composition comprises at least one epoxy resin that is solid at room temperature and has a molecular weight ($M_n$) greater than 700.

In one embodiment of the foamable composition, the one or more blowing agents are selected from the group consisting of azobisisobutyronitrile, azodicarbonamide, di-nitrosopentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide and expandable hollow microspheres. In one embodiment of the foamable composition, at least one of the blowing agents comprises hollow expandable plastic microspheres.

In one embodiment of the foamable composition, at least one of the curatives is a nitrogen-containing compound. Desirably, dicyanamide is used as at least one of the curatives in a quantity of up to 5 wt. %, based on the total weight of the foamable composition.

In one embodiment, the foamable composition additionally comprises at least one flexibilizing/toughening agent selected from the group consisting of isoprene copolymer solid rubbers and butadiene copolymer solid rubbers. Desirably, the at least one flexibilizing/toughening agent is selected from the group consisting of partially cross-linked isoprene-acrylonitrile copolymer solid rubbers and partially cross-linked butadiene-acrylonitrile copolymer solid rubbers.

In one embodiment, the foamable composition additionally comprises at least one reactive diluent selected from the group consisting of monoglycidyl ethers of $C_6$- to $C_{14}$-monoalcohols, monoglycidyl ethers of the oil of dried cashew nut, monoglycidyl ethers of alkyl phenols, diglycidyl ethers of ethylene glycol, diglycidyl ethers of diethylene glycol, diglycidyl ethers of triethylene glycol, diglycidyl ethers of tetraethylene glycol, diglycidyl ethers of propylene glycol, diglycidyl ethers of dipropylene glycol, diglycidyl ethers of tripropylene glycol, diglycidyl ethers of tetrapropylene glycol, diglycidyl ethers of 1,4-butylene glycol, diglycidyl ethers of 1,5-pentanediol, diglycidyl ethers of 1,6-hexanediol, diglycidyl ethers of cyclohexanedimethanol, di- and triglycidyl ethers of trimethylolpropane, and glycidyl esters of $C_6$- to $C_{24}$-carboxylic acids.

Any of the described foamable compositions may additionally comprise at least one filler selected from the group consisting of micaceous fillers, glass fibers, calcium carbonate and hollow glass microspheres. Likewise, any of the described foamable compositions may comprise at least one additive selected from the group consisting of fillers, flexibilizing/toughening agents, blowing agent activators, thixotropic/rheological control agents, colorants, adhesion promoters, and stabilizers.

Any of the described foamable compositions may additionally comprise fibers selected from the group consisting of aramid fibers, carbon fibers, metal fibers, glass fibers, polyamide fibers, polyethylene fibers, polyester fibers and mixtures thereof. Likewise, any of the described foamable compositions may be in granulated form.

In one embodiment, the foamable composition comprises:

| | |
|---|---|
| a. solid epoxy resin(s) | 2 to 60 wt. %; |
| b. polyester(s) | 1 to 30 wt. %; |
| c. solid rubber(s) | 0 to 15 wt. %; |
| d. reactive diluent(s) | 0 to 15 wt. %; |
| e. curing agent(s) and accelerator(s) | 1.5 to 5 wt. %; |
| f. blowing agent(s) | 0.1 to 5 wt. %; |
| g. micaceous filler(s) | 0 to 40 wt. %; |
| h. additional filler(s) | 5 to 40 wt. %; |
| i. fiber(s) | 0 to 30 wt. %; and |
| j. pigment(s) | 0 to 1 wt. %, | wherein the sum of all the ingredients is 100 wt. %.

In another embodiment, the foamable composition comprises

| | |
|---|---|
| a. solid epoxy resin(s) | 2 to 60 wt. %; |
| b. solid polyester(s) | 5 to 15 wt. %; |
| c. solid rubber(s) | 2 to 10 wt. %; |
| d. reactive diluent(s) | 0 to 10 wt. %; |
| e. curing agent(s) and accelerator(s) | 1.5 to 5 wt. %; |
| f. blowing agent(s) | 0.1 to 5 wt. %; |
| g. micaceous filler(s) | 1 to 30 wt. %; |
| h. additional filler(s) | 5 to 40 wt. %; |
| i. fiber(s) | 0.5 to 10 wt. %; and |
| j. pigment(s) | 0 to 1 wt. %, | wherein the sum of all the ingredients is 100 wt. %.

Other embodiments of the invention include an injection molded object comprising the foamable composition of the invention; a foam obtained by heating and curing the foamable composition of the invention; and a composite comprised of a solid article and said foam. Desirably, the composite is comprised of at least one metal component and the foam of obtained by heating and curing the foamable composition of the invention, wherein the foam is adhered to at least one surface of the metal component.

Another aspect of the invention is a process for manufacturing an expandable, thermally curable molded object, comprising:
 a. mixing the ingredients of the foamable composition of the invention at temperatures below 110° C., preferably between 80 and 95° C.;
 b. extruding the foamable composition at temperatures below 110° C., preferably between 80 and 95° C., and granulating, optionally on a cooled metallic belt, to form granules;
 c. cooling the granules;
 d. optionally storing the granules, preferably in containers, bags, drums or sacks;
 e. feeding the granules into an injection molding machine;
 f. melting the granules at temperatures below 110° C. to form a melt and injecting the melt into a mold having pre-determined form of an injection molding machine to form the expandable, thermally curable molded object; and
 g. cooling the molded object and ejecting the molded object out of the mold.

Another aspect of the invention is an expandable, thermally curable molded object produced by a process of the invention. The molded objects are useful for stiffening and/or strengthening a component.

DETAILED DESCRIPTION OF CERTAIN EMBODIMENTS OF THE INVENTION

The foamable compositions of the present invention are characterized by the presence of one or more polyesters. Suitable polyesters include oligomeric and polymeric substances containing a plurality of ester linkages in the backbone of the polymer or oligomer and which may be liquid (glass transition temperature below 0 degrees C.), glass-like (solid) and amorphous (glass transition temperature above 0 degrees C.) or crystalline (e.g., having a melting point between 40 and 125 degrees C., more preferably between 50 and 90 degrees C.) at room temperature. Such substances may, for example, have number average molecular weights in the range from 400 to 20,000 or alternatively in the range from 1,000 to 6,000, although higher molecular weight polyesters may also be employed. Although the nature of the end groups on the polyester is not believed to be critical, polyester polyols (polyesters having terminal —OH groups) are one class of polyesters found to be especially suitable for use in the present invention. If desired, the type of polyester used may be selected so as to also vary the properties of the foamable composition to meet particular needs. For example, utilizing a crystalline polyester having a moderately high melting point (e.g., 50 to 90 degrees C.) but relatively low melt viscosity may help to reduce the surface tack of the foamable composition at room temperature while still permitting the foamable composition to be readily processed and handling (for example, injection molded) at an elevated temperature sufficiently low as to avoid premature activation of the latent curatives and/or blowing agents present (typically between about 60 and 100 degrees C.).

In certain embodiments of the invention, the polyesters are solid at room temperature (i.e. in a temperature range between 18° C. and 25° C., preferably at 22° C.), and have a molecular weight ($M_n$) between 2000 and 9000 and a melting point between 50° C. and 100° C. Crystalline, partially crystalline, but also vitreous amorphous polyesters are particularly preferred. The polyesters can possess hydroxyl groups; for example, the polyesters can have a hydroxyl number between 50 and 10, preferably between 40 and 15 mg KOH/g. Their acid number preferably should be as low as possible and should not exceed 2 to 5 mg KOH/g.

Suitable polyesters include but are not limited to, the liquid, glass-like and amorphous or crystalline polyesters obtainable by condensation of di- or tricarboxylic acids (including aliphatic, aromatic, unsaturated, and/or saturated acids) such as, for example, adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimer fatty acids or mixtures thereof with low molecular weight diols or triols (including aliphatic, aromatic, saturated, and/or unsaturated diols or triols) such as, for example, ethylene glycol, propylene glycol, diethylene glycol, triethylene glycol, dipropylene glycol, butane-1,4-diol, pentane-1,5-diol, hexane-1,6-diol, octane-1,8-diol, decane-1,10-diol, dodecane-1,12-diol, dimer fatty alcohol, glycerol, cyclohexane dimethanol, trimethylol propane or mixtures thereof. The use of diols or triols containing a plurality of repeating ether-containing moieties (e.g., oxyalkylene groups) such as oligomers or polymers of ethylene glycol, propylene glycol, 1,4-butanediol and the like (such as polyethylene glycol, polypropylene glycol, or polytetramethylene glycol) will provide polyetheresters (sometimes also referred to as polyesterethers), which are also suitable for use as the polyester component of the present invention. Polyesters based on epsilon-caprolactone (also known as "polycaprolactones") as well as polyester polyols of oleochemical origin may also be used. Oleochemical polyester polyols may be obtained, for example, by complete ring opening of epoxidized triglycerides of a fatty mixture containing at least partly olefinically unsaturated fatty acids with one or more alcohols containing 1 to 12 carbon atoms and subsequent partial transesterification of the triglyceride derivatives to form alkyl ester polyols with 1 to 12 carbon atoms in the alkyl group. Polyesters having a block structure may also be used in the present invention, including block copolymers where at least one polymer block is a polyester block and at least one polymer block is a polymer other than a polyester (for example, a polyether).

Particularly preferred polyesters, for at least some embodiments of the invention, include those that are solid at temperatures up to 50° C. and which abruptly change into the liquid state in a narrow temperature range between 60 and 80° C. In the injection molding process, this leads to a significant reduction in viscosity of the foamable composition prepared using such polyesters at processing temperatures of ca. 80-95° C. Likewise, on cooling the molded parts prepared therefrom, the solidification step of the polyester preferably is reversible in order to be able to open the injection mold and to obtain dimensionally stable parts.

Suitable polyesters are readily available from commercial sources, including, for example, the DYNACOLL 7000 series of polyesters (supplied by Degussa/Creanova), such as the DYNACOLL 7100 series of amorphous polyesters, the DYNACOLL 7200 series of liquid polyesters, and especially the DYNACOLL 7300 series of crystalline polyesters. Other suitable commercial polyesters include the GRILTEX copolyesters available from EMS-Griltech, such as GRILTEX D1582E.

Sufficient polyester may be incorporated into the foamable composition so as to reduce the extent of corrosion that occurs when the structural reinforcement foam formed from the foamable composition is placed in contact with the surface of a metal part. The optimum amount of polyester will vary somewhat depending upon the identity of the polyester(s) selected for use and the type of metal surface, among other factors, but may be readily determined by routine experimentation. Total amounts of polyester within the range of from about 0.1 to about 20 weight % based on the total weight of the foamable composition have thus far been found to generally be effective, however. Where the polyester is being added for the purposes of modifying the surface tackiness of the foamable composition at ambient temperatures and/or modifying its flow properties when heated, similar concentrations of polyester are typically used.

In addition to the polyesters, preferred foam formulations may contain about 35 weight percent to about 60 weight percent of one or more epoxy resins, about 10 weight percent to about 60 weight percent of one or more fillers (with hollow glass microspheres, micaceous fillers, calcium carbonate, and/or glass fibers being especially preferred, although none of these fillers or any other fillers need to be present in order for the polyester to provide improvements in corrosion resistance, surface tackiness and/or processability), about 0.1 weight percent to about 5 weight percent of one or more blowing agents, and about 0.1 weight percent to about 15 weight percent of one or more curatives. The foamable composition may also contain effective amounts of other additives such as blowing agent activators/accelerators, adhesion promoters (e.g., silanes), toughening/flexibilizing agents, thixotropic/rheological control agents, colorants, and stabilizers. It is particularly advantageous to select formulation components which, when mixed together, provide a foamable composition of a consistency which can be readily molded or shaped into any desirable configuration prior to foaming and curing and that is dimensionally stable and preferably non-tacky at room temperature.

Any of the epoxy resins having an average of more than one (preferably about two or more) epoxy groups per molecule known or referred to in the art may be utilized as the epoxy resin component of the present invention.

A large number of polyepoxides, which have at least two 1,2-epoxy groups per molecule, are suitable epoxy resins. Epoxy resins are described, for example, in the chapter entitled "Epoxy Resins" in the Second Edition of the *Encyclopedia of Polymer Science and Engineering*, Volume 6, pp. 322-382 (1986). The epoxy equivalent of these polyepoxides can, for example, vary between 150 and 50,000, preferably between 170 and 5000. Fundamentally, the polyepoxides can be saturated, unsaturated, cyclic or acyclic, aliphatic, alicyclic, aromatic or heterocyclic polyepoxide compounds. Exemplary epoxy resins include polyglycidyl ethers obtained by reacting polyhydric phenols such as bisphenol A, bisphenol F, bisphenol AD, catechol, pyrocatechol, hydroquinone, resorcinol, bis(4-hydroxyphenyl)-1,1-isobutane, 4,4'-dihydroxybenzophenone, bis(4-hydroxyphenyl)-1,1-ethane, or 1,5-hydroxynaphthalene or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commercial sources are suitable for use in the present invention. Preferably, the epoxy resin has an epoxide equivalent molecular weight of from about 150 to 1000 (e.g., about 300 to about 700). The use of epoxy resins based on glycidyl ethers of bisphenol A is especially advantageous. The epoxy resin preferably contains an average of about 2 epoxy groups per molecule and should be selected so as to provide the desired combination of properties in both the foamable composition and the final cured foam. In certain embodiments of the invention, the foamable composition contains at least one epoxy resin that is solid at room temperature and/or has a molecular weight ($M_n$) greater than 700.

The hardening of the epoxy resins utilized in the present invention may be accomplished by the addition of any of the chemical materials known in the art for curing such resins. Such materials are sometimes referred to herein as "curatives", but also include the substances known to workers in the field as curing agents, hardeners, activators, catalysts or accelerators. While certain curatives promote curing by catalytic action, others participate directly in the reaction of the resin and are incorporated into the thermoset polymeric network formed by condensation, chain-extension and/or crosslinking of the synthetic resin. It is particularly desirable to employ at least one curative which is a nitrogen-containing compound. Such curatives (along with other curatives useful for hardening epoxy resins) are described in the chapter in the *Encyclopedia of Polymer Science and Engineering* referenced hereinabove. Preferably, one of the selection criteria for curatives useful in the inventive heat foamable, thermally curable composition is naturally the low solubility of said substances at room temperature in the resin system, with the result that solid, finely ground curing agents have preference here, in particular dicyandiamide is suitable. This ensures a good storage stability of the composition at room temperature.

Suitable nitrogen-containing compounds useful as curatives include amino compounds, amine salts, and quaternary ammonium compounds. They can be selected from the following compounds: guanidines, substituted guanidines, substituted ureas, melamine resins, guanamine derivatives, cyclic tertiary amines, aromatic amines and/or their mixtures. The curing agents may be incorporated into the curing reaction stoichiometrically, and they may also be catalytically active. Examples of the substituted guanidines are methyl guanidine, dimethyl guanidine, trimethyl guanidine, tetramethyl guanidine, methyl isobiguanidine, dimethyl isobiguanidine, tetramethyl isobiguanidine, hexamethyl isobiguanidine, heptamethyl isobiguanidine and most particularly cyanoguanidine (dicyandiamide). Alkylated benzoguanamine resins, benzoguanamine resins or methoxymethyl ethoxymethyl benzoguanamine may be mentioned as representatives of suitable guanamine derivatives. Particularly preferred types of nitrogen-containing compounds include amine-epoxy adducts, imidazoles, ureas, and guanidines. In one desirable embodiment of the invention, two or more different types of these nitrogen-containing compounds are used in combination.

Catalytically active substituted ureas may be used in addition to or instead of the aforementioned curing agents. These are in particular p-chlorophenyl-N,N-dimethylurea (monuron), 3-phenyl-1,1-dimethylurea (fenuron) or 3,4-dichlorophenyl-N,N-dimethiyurea (diuron). In principle, tertiary acryl or alkyl amines, such as, e.g., benzyldimethylamine, tris(dimethylamino)phenol, piperidine or piperidine derivatives may also be used, but in many cases these have an excessively high solubility in the foamable composition, such that a useful storage stability of the single-component system is not achieved here. In addition, various, preferably solid imidazole derivatives may be used as the catalytically active accelerator. There may be mentioned as representatives 2-ethyl-2-methylimidazole, N-butylimidazole, benzimidazole, as well as $N-C_1$- to $C_{12}$ alkyl imidazoles or N-aryl imidazoles. Adducts of amino compounds and epoxy resins are also suitable accelerator additives to the mentioned curing agents. Suitable amino compounds are tertiary aliphatic, aromatic or cyclic amines. Exemplary suitable epoxy compounds are polyepoxides based on glycidyl ethers of bisphenol A or F or of resorcinol. Specific examples of such adducts are adducts of tertiary amines such as 2-dimethylamino ethanol, N-substituted piperazines, N-substituted homopiperazines, N-substituted aminophenols on di- or polyglycidyl ethers of bisphenol A or F or of resorcinol.

Such amine-epoxy adducts are well-known in the art and are described, for example, in U.S. Pat. Nos. 3,756,984; 4,066,625; 4,268,656; 4,360,649; 4,542,202; 4,546,155; 5,134,239; 5,407,978; 5,543,486; 5,548,058; 5,430,112; 5,464,910; 5,439,977; 5,717,011; 5,733,954; 5,789,498; 5,798,399 and 5,801,218, each of which is incorporated herein by reference in its entirety. Such amine-epoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine could be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademarks AJICURE PN-40, AJICURE PN-23, AJICURE PN-50, and AJICURE AH-300 are especially preferred for use in the present invention.

Dicyandiamide (sold commercially by Air Products & Chemicals under the trademark DICY) is also a particularly preferred curative, although other guanidine compounds may also be utilized. The curative system may also comprise one or more ureas, either alone or in combination with other types of curatives (especially guanidines such as dicyandiamide). Suitable ureas include alkyl and aryl substituted ureas. Many such ureas are available commercially, for example, N,N'-dimethyl urea, which is sold under the trademark AMICURE UR by Air Products. Imidazoles, including alkyl and aryl substituted imidazoles such as 2-ethyl-4-methyl imidazole, constitute another class of suitable curatives.

In one desirable embodiment of the invention, dicyandiamide (preferably, about 0.5-5 wt % based on the total weight of the foamable composition) is used in combination with an amine-epoxy adduct (preferably, about 0.05-3 wt %) in the curative system.

The curative system (i.e., the specific curatives and the amounts of such curatives) should be selected such that it does not catalyze curing of the foamable composition to any significant extent under typical storage conditions over an extended period of time. Additionally, it will generally be desirable to select a curative system that permits the foamable composition to be shaped (by injection molding, for example) at a moderately elevated temperature without significant curing or reaction of the components of the foamable composition taking place.

Selection of the blowing agent or blowing agents to be used in the present invention is not believed to be particularly critical, with both chemical blowing agents as well as physical blowing agents being suitable and with latent (heat-activated) blowing agents being particularly preferred. Particularly preferred, however, are the expandable hollow plastic microspheres, wherein a shell comprised of a polymer such as a polyvinylidene chloride copolymer or a acrylonitrile/(meth) acrylate copolymer encapsulates a volatile blowing agent such as a lower alkyl hydrocarbon. Such expandable microspheres are obtainable commercially under the names "Dualite", "Micropearl" or "Expancel" from the firms Henkel Corporation (formerly Pierce & Stevens), Matsumoto or Akzo Nobel, respectively.

Any of the chemical blowing agents known in the art may be employed, with azodicarbonamide (also sometimes referred to as 1,1'-azobisformamide, AZDC or ADC) and sulfonyl hydrazides providing particularly good performance. In one embodiment of the invention, azodicarbonamide is utilized as the predominate or, more preferably, sole blowing agent; mixtures with sulfonylhydrazides may be desirable or certain purposes, however. Azodicarbonamide is available from a number of commercial sources; for example, it is sold under the trademark UNICELL by Dong Jin Chemical of South Korea and under the CALOGEN trademark by Uniroyal Chemical. "Activated" or "modified" forms of azodicarbonamide may be used to advantage. Suitable sulfonylhydrazide blowing agents include, but are not limited to, p,p'-oxybis(benzenesulfonylhydrazide) (sold by Uniroyal Chemical under the trademark CELOGEN OT), p-toluenesulfonylhydrazide (sold by Uniroyal Chemical under the trademark CELOGEN TSH) and the like. Other suitable chemical blowing agents include, but are not limited to, azobisisobutyronitrile, di-nitrosopentamethylenetetramine, diphenylsulfone-3,3'-disulfohydrazide, benzene-1,3-disulfohydrazide, and p-toluenesulfonyl semicarbazide. The particle size of the blowing agent may be adjusted so as to provide the desired foaming characteristics in the cured foam. Smaller particle sizes, for example, tend to provide foams having more uniform cell structure.

The amount of blowing agent may be adapted or varied as needed in order to impart the desired degree of expandability to the foamable composition. For example, the blowing agent and the amount of blowing agent may (together with other variables) be selected such that the foamable composition expands at least 10%, 25%, 50%, 100%, 150%, 200% or even higher in volume when heated. Typically, the foamable composition is formulated to provide from 50% to 300% or from 100% to 200% in volume upon activation. In certain embodiments of the invention, the foamable composition may contain at least 0.1 or at least 0.5 weight percent of one or more blowing agents in total and/or not more than 10 or not more than 5 weight percent of one or more blowing agents in total.

In some formulations, it may be desirable to also use a blowing agent activator or accelerator so as to lower the temperature at which release of gas from the blowing agent takes place. Suitable blowing agent activators include, but are not limited to, ureas (such as the surface-coated, oil-treated urea sold by Uniroyal Chemicals under the trademark BIK-OT) polyols, organic acids, amines, and lead, zinc, tin, calcium and cadmium oxides and salts (including carboxylic acid salts). Typically, from about 0.1% to about 2% blowing agent activator based on the weight of the foamable composition is employed, although the optimum amount will of course vary depending upon the activator/accelerator selected, the amount of blowing agent, cure temperature and other variables. Excess activator should not be used since the storage stability may thereby be adversely affected.

It will be especially desirable to include one or more glass fillers in the foamable composition, as such fillers impart useful characteristics to the resulting structural reinforcement foam. For example, hollow glass microspheres may be added to reduce the density of the foam while maintaining good strength and stiffness. Commercially available hollow glass microspheres (sometimes also referred to as glass microballoons or microbubbles) include the materials sold by Minnesota Mining & Manufacturing under the trademark SCOTCHLITE, with suitable grades including those available under the designations B38, C15, K20, and VS 5500. The glass microspheres preferably have diameters in the range of from about 5 to 200 micrometers (preferably, no greater than 70 micrometers). The crush strength of the hollow glass microspheres may be selected in accordance with the desired characteristics of the cured thermoset foam or reinforced structural member containing such foam. In a particularly desirable embodiment of the invention, hollow glass microspheres comprise from about 1 to about 30 percent by weight of the foamable composition. Glass fiber is another preferred type of glass filler, since it helps increase the strength and stiffness of the standard reinforcement foam. The glass fiber may be chopped, milled, or in other suitable physical form.

Other types of fillers may also optionally be present in the foamable composition. Mica is a particularly preferred filler. Preferably, mica-containing ("micaceous") fillers can be used together with other types of fillers; quite particularly preferred here is a so-called 2-component filler of muscovite-mica and quartz with low heavy metal content.

Any of the conventional organic or inorganic fillers known in the thermosettable resin art may be used including, for example, silica (including fumed or pyrogenic silica, which may also function as a thixotropic or Theological control agent), calcium carbonate (including coated and/or precipitated calcium carbonate, which may also act as a thixotropic or rheological control agent, especially when it is in the form of fine particles as well as ground or precipitated chalks), fibers other than glass fibers (e.g., wollastonite fibers, carbon fibers, ceramic fibers, aramid fibers), alumina, carbon black (which also functions as a pigment), calcium magnesium carbonates, barites, silicate fillers of the aluminum magnesium calcium silicate type (e.g., wollastonite, chlorite), clays, sand, metals (e.g. aluminum powder), microspheres other than glass microspheres such as ceramic microspheres, thermoplastic resin microspheres, thermoset resin microspheres, and carbon microspheres (all of which may be solid or hollow, expanded or expandable) and the like.

In a particularly preferred embodiment, the foamable compositions comprise short fibers based on aramid fibers, carbon fibers, metal fibers (e.g., of aluminum), glass fibers, polyamide fibers, polyethylene fibers or polyester fibers, wherein said fibers are preferably pulp fibers or staple fibers with a fiber length of between 0.5 and 6 mm and a diameter of 5 to 20 µm. Particularly preferred here are polyamide fibers of the aramid fiber type or also polyester fibers.

According to the invention, it is the aim to employ the thermally expandable, heat curable composition for the production of specifically lightweight structures. Accordingly, it is particularly desirable for the foamable composition to comprise one or more so called light fillers, selected from the group consisting of the metal hollow spheres, such as, e.g., steel hollow spheres, glass hollow spheres, fly ash (fillite), plastic hollow spheres based on phenol resins, epoxy resins or polyesters, expanded hollow microspheres with wall materials of (meth)acrylate copolymers, polystyrene, styrene (meth)acrylate copolymers and in particular polyvinylidene chloride, as well as copolymers of vinylidene chloride with acrylonitrile and/or (meth)acrylates (including expanded hollow microspheres coated with finely divided materials such as calcium carbonate or silica, including, for example, the "Dualite" brand microspheres sold by Henkel Corporation), ceramic hollow spheres or organic lightweight materials of natural origin such as ground-up nut shells, for example the shells of cashew nuts, coconuts or peanut shells, as well as cork powder or coke dust. Particularly preferred are light fillers based on hollow microspheres, which guarantee a compression strength of the molded object in the cured molded body matrix.

In addition, the foamable compositions according to the invention may contain one or more finely divided thermoplastic polymer powders. Said thermoplastic polymer powders may in principle be selected from a large number of finely divided polymer powders, there may be mentioned for example vinyl acetate homopolymer, vinyl acetate copolymers, ethylene vinyl acetate copolymers, vinyl chloride homopolymer (PVC) or copolymers of vinyl chloride with vinyl acetate and/or (meth)acrylates, styrene-homo- or copolymers, (meth)acrylate-homo- or copolymers (e.g., polymethylmethacrylate, butyl acrylate/methyl acrylate copolymers), polyolefins, polyethers or polyvinyl butyral. Particularly preferred thermoplastic polymers contain functional groups such as carboxyl groups, carboxylic acid anhydride groups or imidazole groups and/or have a core/shell structure. The thermoplastic polymer powders generally have a mean particle size of below 1 mm, preferably below 350 microns, and most particularly preferably below 100 microns.

The foamable composition may also include one or more solid rubbers, as such additives will toughen the thermoset foam produced from the foamable composition and reduce the tendency of the foam to crack under stress. As used herein, the term "rubbers" includes both rubbers and elastomers. Suitable rubbers include thermoplastic as well as thermosettable (reactive) rubbers. In one embodiment, solid rubbers are utilized, typically having a molecular weight $M_n$ of 100,000 or higher. Illustrative types of rubber include styrene-butadiene rubbers (SBR), nitrile-butadiene rubbers (including, for example, butadiene-acrylonitrile rubbers, e.g., NIPOL 1411 available from Zeon Chemicals), butyl rubbers, polyisoprene, natural rubber, polybutadiene, chlorobutyl rubbers (neoprene), isobutylene polymers, alpha-olefin elastomers, ethylene-propylene elastomers, chlorosulfonated polyethylenes, ethylene-propylene-diene (EPDM) rubbers, polyurethane rubbers and the like. Partially crosslinked solid rubbers based on isoprene-acrylonitrile or butadiene-acrylonitrile copolymers are particularly suitable. Thermoplastic block copolymers are one particularly preferred class of rubbers for use in the present invention. Such materials contain one or more base segments ("A") covalently bonded to one or more soft or elastomeric segments ("B"). The A segments may be polystyrene, poly (alpha-methylstyrene), polyethylene, polyurethane, polysulfone, polyester, polycarbonate or the like. The B segments may be polybutadiene, polyisoprene, poly (ethylene-cobutylene), polydimethylsiloxane, polyether, or the like. The block copolymers may have a linear, branched, radial or star structure and may, for example, correspond to the general structure A-B-A, (A-B)$_n$, and so forth. SIS, SEBS and SBS block copolymers are examples of specific types of such materials. A-B-C styrene-butadiene-methacrylate (SBM) tri-block copolymers, such as the NANOSTRENGTH E20 toughener sold by Arkema, may also be utilized in the present invention. The content of solid rubber can range from 0 to 15 wt. %, preferably 2 to 10 wt. % of the total foamable composition.

Other optional components include diluents (reactive or non-reactive) such as glycidyl ethers, glycidyl esters, acrylics, solvents and plasticizers, tackifiers, waxes, oils, toughening or flexibilizing agents (e.g., aliphatic diepoxides, polyaminoamides, liquid polysulfide polymers, liquid rubbers including liquid nitrile rubbers such as butadiene-acrylonitrile copolymers, which may be functionalized with carboxy groups, amine groups or the like), coupling agents/ wetting agents/adhesion promoters (e.g., silanes), corrosion inhibitors other than polyesters (e.g., organotitanates and organozirconates), metallic coagents, colorants (e.g., dyes and pigments such as carbon black), stabilizers (e.g., antioxidants, UV stabilizers) and the like.

Optionally, the foamable compositions can comprise reactive diluents. In the context of this invention, reactive diluents are low-viscosity substances (glycidyl ethers or glycidyl esters) with an aliphatic or aromatic structure, which comprise epoxy groups. Said reactive thinners on the one hand serve to reduce the viscosity of the foamable composition above the softening point, on the other hand they control the pre-gelling process in the injection molding. Typical examples of reactive thinners to be used according to the invention are mono-, di- or triglycidyl ethers of C6 to C14 monoalcohols or alkyl phenols, as well as the monoglycidyl ethers of cashew nut shell oil, diglycidyl ethers of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentane diol, 1,6-hexane diol, cyclohexanedimethanol, triglycidyl ethers of trimethylol propane, and the glycidyl esters of C6 to C24 carboxylic acids or their mixtures.

The proportions of the individual components of the foamable composition may vary within relatively wide limits according to the range of requirements needed for the molding or laminate prepared therefrom in terms of its processing properties, the flexibility, the required stiffening effect and the adhesive bond with the substrates.

Preferred foamable compositions in accordance with the present invention may be comprised of the following components:

| | |
|---|---|
| Epoxy Resin(s) | 35-60 weight % |
| Polyester(s) | 0.1-10 weight % |
| Rubber(s)/Toughening Agent(s) | 0-6 weight % (e.g., 0.1-5 weight %) |
| Curing Agent(s)/Catalyst(s) | 0.1-10 weight % |
| Adhesion Promoter(s) (e.g., silane) | 0-2 weight % (e.g., 0.05-1 weight %) |
| Blowing Agent(s) | 0.1-10 weight % |
| Filler(s) | 0-60 weight % (e.g., 25-50 weight %) |

Other embodiments of the present invention include foamable compositions comprising:

| | | |
|---|---|---|
| a) solid epoxy resin(s) | 2 to 60 wt. %; | |
| b) polyester(s) | 1 to 30 wt. %, | preferably 5 to 15 wt. %; |
| c) solid rubber(s) | 0 to 15 wt. %, | preferably 2 to 10 wt. %; |
| d) reactive diluent(s) | 0 to 15 wt. %, | preferably 0 to 10 wt. %; |
| e) curing agent(s) and accelerator(s) | 0.5 to 5 wt. %; | |
| f) blowing agent(s) | 0.1 to 5 wt. %; | |
| g) micaceous filler(s) | 0 to 40 wt. %, | preferably 1 to 30 wt. %; |
| h) additional fillers(s) | 5 to 40 wt. %; | |
| i) fiber(s) | 0 to 30 wt. %, | preferably 0.5 to 10 wt. %; and |
| j) pigment(s) | 0 to 1 wt. %; | | wherein the sum of all the ingredients is 100%.

Methods of preparing foamable compositions based on epoxy resins are well-known in the industry. To obtain the foamable compositions of the present invention, simply add the polyester(s) at any point of the known processes. To produce the foamable composition according to the invention, the components may be combined in a conventional mixer unit such as a planetary mixer, kneader or similar. The blowing agent, curing agent and accelerator are then added, wherein the material temperature is controlled so as not to exceed 110° C., preferably however not to exceed 90° C., in particular during and after the addition of the blowing agent, curing agent and/or accelerator.

The inventive compositions can be easily manufactured in granular form and consequently easily stored and transported in conventional containers, big bags, drums or sacks. They can be further processed in conventional injection molding machines without special hoppers, dosing equipment and conveying equipment. The structural foams that can be manufactured from these compositions have comparably as good compression load or bending load properties as the previously known compositions based on epoxy resins (i.e., without polyesters). Surprisingly, the inventive compositions, in spite of good flow behavior in injection molding machines, do not show any run-off or wash out in the production cycle of the intermediate component during automobile production in the cleaning and pre-treatment baths at 65° C. and with simultaneous flow forces. Moreover, no tackiness of the molded objects or granules was observed at temperatures below 45° C.

In comparison with the molded objects known up to now, the molded objects manufactured from the inventive compositions exhibit an improved corrosion behavior; in addition, higher compression strengths are achieved at similar degrees of foaming.

The resulting foamable composition may be shaped by extrusion, molding (e.g., injection molding, overmolding) or by hand or other means into any desired configuration. A quantity of the foamable composition can, for example, be placed into the appropriate cavity of a metal part. In one embodiment of the invention, one or more portions of the foamable composition are attached to or otherwise mounted on a carrier which is then utilized to position the foamable composition in the desired location and orientation within the cavity. The foamable composition is foamed and cured by heating, preferably at a temperature of at least about 250 degrees F. (about 120 degrees C.), more preferably at least about 300 degrees F. (about 150 degrees C.). Typically, the foamable composition expands and comes into contact with one or more metal surfaces within the cavity and forms a strong adherent bond with such surfaces. Heating is typically carried out for a time effective to achieve the desired degree of expansion and curing.

The foamable compositions of the present invention may be utilized in any end-use application where a relatively lightweight, yet strong, thermoset foam is needed. However, the foamable compositions are especially useful in the production of automobiles and other vehicles to maintain or increase the strength of structural members such as rockers, pillars, posts, frame rails, bumpers, wheel wells, radiator support beams, doors, reinforcing beams and the like. The foamable compositions may be used in the form of relatively flat sheets or patches, optionally in combination with layers of other resins and/or reinforcing materials, for the purpose of stiffening or reinforcing thin metal sheets such as door panels, hoods, trunk lids, body panels and the like. The use of structural foams in such applications is described, for example, in U.S. Pat. Nos. 6,406,078; 6,341,467; 6,332,731; 6,287,666; 6,270,600; 6,237,304; 6,168,226; 6,165,588; 6,096,403; 6,068,424; 6,058,673; 5,888,600; 5,884,960; 6,455,126; 6,451,231; H002,047; 6,865,811; 6,863,957; 6,482,496; 4,901,500; 4,908,930; 4,751,249; 4,978,562; 4,995,545; 5,124,186; 5,575,526; 5,755,486; 4,923,902; 4,922,596; 4,861,097; 4,732,806; 4,695,343; and 4,610,836 (each of which is incorporated herein by reference in its entirety). Other uses for the foamable compositions of the present invention include the bonding of hem flanges, the bonding of substrates having a gap between the substrates that is to be filled, as well as other applications where structural adhesives are typically used, such as the bonding of similar or different materials to transfer high loads and replace other joining methods like welding, screwing or riveting.

Preferably, thermally expandable molded objects that can be used for reinforcing and/or strengthening metallic components are manufactured from the expandable, thermally curable compositions in injection molding processes at low pressures and low temperatures.

One major application of the inventive molded objects is for stiffening and strengthening components, especially components for white goods or body components such as body frames, doors, trunk lids or decks, engine hoods and/or roofing parts in the automotive construction industry.

Thus, one embodiment of the present invention provides a process for reinforcing and/or strengthening metallic components, particularly components of "white goods" (kitchen equipment or machines) or body components (especially vehicle body components), which includes the following process steps.

In a first step, the abovementioned constituents of the foamable composition are homogeneously mixed at temperatures below 110° C. and then extruded in granular form (e.g., an extruded bead, stream or ribbon may be cut so as to provide a plurality of granules).

Optionally the granules are stored, preferably in containers, big bags, drums or sacks. To manufacture a molding, the granules can then be transferred into the hopper and feeding device of a commercial injection molding machine, where the binder mixture is injected at temperatures of 60° C. to 110° C., preferably at temperatures of 70° C. to 90° C. under temperature-controlled conditions into an injection mold. In the mold, there is optionally a metal, thermoset or thermoplastic support (which may also be referred to as a carrier), onto which the foamable composition is injected. The molding is then cooled down to temperatures below 50° C., the surface of the foamable composition being non-sticky when ejected from the mold, such that the expandable molded object can be packaged without any special requirement and can withstand transportation, even in summer in southern countries, without the need for a refrigerated truck.

For the end use, the expandable molded object is placed onto the flat metallic substrate or into the cavity being reinforced, for example a vehicle body, and fixed. As is known, in the subsequent heating process of the paint oven, the vehicle body is brought to temperatures between 110° C. and 200° C.; this heat expands the volume of the expandable molded object by 50 to 300% and the reactive resin matrix cures to form a thermoset.

Accordingly, a further subject matter of the present invention is the use of the expandable molded objects for reinforcing and strengthening flat metal sheets and/or metallic hollow structures, particularly hollow body parts such as body frames, body supports, body pillars as well as wide gaps and cracks between body parts in the automobile construction industry or for components for "white goods".

In the following exemplifying embodiments, the invention is intended to be explained in more detail, wherein the selection of the examples is not intended to represent any limitation of the scope of the subject matter of the invention, they are simply to represent in an exemplary manner individual embodiments and advantageous effects of the invention.

All the quantities given in the following examples are in parts by weight or weight percent, unless stated otherwise.

EXAMPLES

Examples 1-2

Exemplary foamable compositions in accordance with the invention are described in Table 1.

TABLE 1

| Component | Example 1 (Wt. %) | Example 2 (Wt. %) |
|---|---|---|
| Epoxy Resin[1] | 47.06 | 47.06 |
| Polyester[2] | 4.00 | 4.00 |
| Rubber[3] | 2.00 | 2.00 |
| Curing Agent A[4] | 1.71 | 1.71 |
| Silane[5] | 0.32 | 0.32 |
| Curing Agent B[6] | 0.86 | 0.86 |
| Blowing Agent[7] | 2.09 | 2.09 |
| Chopped Glass Fibers[8] | 5.35 | 5.35 |
| Mica[9] | 27.85 | 13.93 |
| Hollow Glass Microspheres[10] | — | 13.93 |
| Calcium Carbonate[11] | 6.42 | 6.42 |
| Red Pigment | 0.21 | 0.21 |
| Thixotropic Agent[12] | 2.14 | 2.14 |

[1]EPON 1001F (diglycidyl ether of bisphenol A; epoxy equivalent weight 525-550; melting point 75-80 degrees C.; Hexion Specialty Chemicals)
[2]DYNACOLL 7380 (Degussa/Creanova)
[3]NIPOL 1411 (Zeon Chemicals)
[4]DICY CG 1200 (Air Products & Chemicals)
[5]gamma propoxy silane
[6]AJICURE PN-50 (Ajinomoto)
[7]EXPANCEL 091DU140 (Akzo Nobel)
[8]PPG 3075, 3 mm
[9]Mineralite
[10]VS 5500 (3M)
[11]ULTRA PFLEX (Specialty Minerals)
[12]CAB-O-SIL TS-720 fumed silica (Cabot Chemical)

The foamable compositions may be prepared using a double planetary Ross mixer heated at about 80 degrees C. The epoxy resin, polyester, and rubber are combined first and mixed for about 20 minutes before adding the blowing agent, glass fibers, mica, and optional hollow glass microspheres. After mixing for another 15 minutes, the remaining components are added and mixing continued for another 5 minutes before drawing a vacuum and mixing for another 15 minutes. The foamable composition of Example 1 exhibited about 184% expansion after heating 30 minutes at 177 degrees, while the foamable composition of Example 2 exhibited about 134% expansion under the same conditions.

Examples 3-5

Foamable compositions similar to Examples 1 and 2 were prepared both with and without polyester; and the adhesive strength to metal panels of foams prepared from these foamable compositions was evaluated, both before and after exposure to standard corrosion cycle conditions. The following results were obtained, which demonstrate the improvements in corrosion resistance that can be achieved by incorporating a polyester in the foamable composition:

Example 3

Comparative; No Polyester

| | |
|---|---|
| Initial Adhesive Strength: | 334 psi |
| Adhesive Strength after Corrosion Cycle Exposure: | 44 psi |
| | (86.8% loss) |

Example 4

In Accordance with Invention; DYNACOLL 7380 Polyester

| | |
|---|---|
| Initial Adhesive Strength: | 411 psi |
| Adhesive Strength after Corrosion Cycle Exposure: | 367 psi |
| | (10.6% loss) |

Example 5

In Accordance with Invention; GRILTEX D 1582E Copolyester

| | |
|---|---|
| Initial Adhesive Strength: | 436 psi |
| Adhesive Strength after Corrosion Cycle Exposure: | 360 psi |
| | (17.4% loss) |

Examples 6-8

The compositions listed in Table 2 below were mixed to homogeneity in a planetary mixer equipped with a vent; measures were taken to ensure the composition temperature did not exceed 70° C.

TABLE 2

| Components | Example 6 | Example 7 | Example 8 |
|---|---|---|---|
| Epoxy resin[1] | 44.00 | 44.00 | 44.00 |
| Polyester[2] | 7.00 | 3.50 | 0.00 |
| Filler (1)[3] | 25.50 | 29.00 | 32.50 |
| Glass fiber | 4.00 | 4.00 | 4.00 |
| Filler (2)[4] | 6.00 | 6.00 | 6.00 |
| Color paste | 0.20 | 0.20 | 0.20 |
| Blowing agent[5] | 2.40 | 2.40 | 2.40 |
| Accelerator[6] | 0.80 | 0.80 | 0.80 |
| Curing agent[7] | 1.60 | 1.60 | 1.60 |
| Thixotrope[8] | 2.00 | 2.00 | 2.00 |
| Flexibilizer[9] | 6.50 | 6.50 | 6.50 |
| Sum Total: | 100.00 | 100.00 | 100.00 |

The results obtained for these compositions are shown in Table 3.

TABLE 3

| | Example 6 | Example 7 | Example 8 |
|---|---|---|---|
| Foaming degree/25' @ 175° C. | | | |
| Foaming degree % | 197 | 206 | 190 |
| Non-tackiness/shape stability[10] | | | |
| 1 h/50° C. | 1 | 2 | 4 |
| 1 h/60° C. | 2 | 5 | 6 |
| Flow behavior in injection (mm) | 150 | 80 | 45 |
| Aging (cataplasma test)[11] | | | |
| 25 min 175° C.; H0 cataplasma | 3.2/100c | 3.43/100c | 3.5/100c |
| 25 min 175° C.; H7 cataplasma | 2.4/100c | 2.57/95c | 2.3/95c |
| 25 min 175° C.; H21 cataplasma | 2.3/100c | 2.4/100c | 2.2/100c |
| Compression strength $F_{max}$ · [MPa] | | | |
| 25 min @ 175° C. | 15 | 16 | 20 |
| Vertical run-off[10] | | | |
| 10 min @ 70° C. + 25 min @ 175° C. | 1 | 1 | 1 |
| Storage stability Pa · s[12] | | | |
| Immediate | 1400 | 8900 | 14800 |
| 24 h/80° C. | 7600 | 44900 | 92000 |
| 10 Weeks VDA[13] | ok | ok | ok |
| APGE Test | ok | ok | n. ok |

Notes:
[1] Room temperature-solid epoxy resin based on bisphenol A, molecular weight ($M_n$) 1150, melting range 65-74° C.
[2] Hydroxyl group-containing polyester, molecular weight ($M_n$) 3500, hydroxyl number 30.5 mg KOH/g, melting point 70° C.
[3] 2-component filler of muscovite-mica and quartz
[4] Chalk, ground or precipitated
[5] Blowing agent (plastic hollow spheres "Expancel 091 DU 140", Akzo Nobel)
[6] finely ground accelerator (amino adduct on epoxy resin containing epoxy and tertiary amine groups)
[7] Dicyandiamide
[8] Pyrogenic silica CAB-O-SIL TS 720, Cabot
[9] Acrylonitrile/butadiene polymer, 38% AN content, partially crosslinked, average particle size 0.1 mm
[10] Marking similar to school grades, scale 1-5 (1 = very good, 5 = unsatisfactory)
[11] Cataplasma test: "wet cataplasma" according to D 47 1165 Peugeot-Citroen tensile shear strength on 1.8 mm high elastic limit steel, hot dip galvanized, in which c = cohesive break, a/c = adhesive/cohesive break with percent cohesive fraction, H0 = starting value (unaged), H7 = 7 days cataplasma test, H14 = 14 days cataplasma test,
[12] viscometrically with oscillation measurement between 80° C. and 140° C.
[13] Test on sandwich design of structural foam and steel sheet according to VDA (Verband Der Automobilindustrie e.V.), "ok" means test requirements passed, "n. ok" test requirements failed.

Because of the good shape stability and storage stability of the uncured compositions and their lack of surface tack, granule particles can be manufactured from such compositions with good shape and storage stability and can be processed into molded objects without problem on standard injection molding machines. In comparison with the compositions from the prior art, the cured molded objects show comparably good mechanical properties and improved corrosion properties, particularly in aging tests according to the APGE test (30 cycles) of the Ford Motor Company.

An APGE cycle consists of 15 minutes salt-water dip (5% salt solution), followed by 1 hr 45 minutes drip drying at room temperature, and followed by 22 hr storage at 50° C. and 90% relative humidity. Compositions from the prior art exhibit poorer values in the APGE test.

What is claimed is:
1. A foamable composition comprising
   a) one or more epoxy resins present in an amount of 2 to 60 wt. %;
   b) one or more curatives;
   c) one or more blowing agents; and
   d) one or more hydroxyl-group containing polyesters present in an amount of 3.5 weight % to 7.0 weight %, said one or more polyesters being selected such that said foamable composition is granulatable into granules having non-tacky surfaces at room temperature suitable for use in an injection molding process.

2. The foamable composition of claim 1 wherein said one or more polyesters are present in an amount effective to reduce corrosion when a foam obtained from said foamable composition is in contact with a metal surface as compared to a foam obtained from an analogous foamable composition not containing any of said polyesters.

3. The foamable composition of claim 1 wherein at least one of said one or more polyesters is solid at room temperature.

4. The foamable composition of claim 1 wherein at least one of said one or more polyesters is amorphous, partially crystalline or crystalline at room temperature.

5. The foamable composition of claim 1 comprising at least one polyester polyol.

6. The foamable composition of claim 1 wherein at least one of the epoxy resins is a glycidyl ether of a polyhydric phenol.

7. The foamable composition of claim 1 comprising at least one epoxy resin that is solid at room temperature and has a molecular weight (Mn) greater than 700.

8. The foamable composition of claim 1 wherein at least one of the curatives is a nitrogen-containing compound.

9. The foamable composition of claim 1 additionally comprising at least one filler selected from the group consisting of micaceous fillers, glass fibers, calcium carbonate and hollow glass microspheres.

10. The foamable composition of claim 1 additionally comprising at least one additive selected from the group consisting of fillers, flexibilizing/toughening agents, blowing agent activators, thixotropic/rheological control agents, colorants, adhesion promoters, and stabilizers.

11. The foamable composition of claim 1 additionally comprising at least one flexibilizing/toughening agent selected from the group consisting of isoprene copolymer solid rubbers and butadiene copolymer solid rubbers.

12. The foamable composition of claim 1, additionally comprising at least one reactive diluent selected from the group consisting of monoglycidyl ethers of $C_6$- to $C_{14}$-monoalcohols, monoglycidyl ethers of the oil of dried cashew nut, monoglycidyl ethers of alkyl phenols, diglycidyl ethers of ethylene glycol, diglycidyl ethers of diethylene glycol, diglycidyl ethers of triethylene glycol, diglycidyl ethers of tetraethylene glycol, diglycidyl ethers of propylene glycol, diglycidyl ethers of dipropylene glycol, diglycidyl ethers of tripropylene glycol, diglycidyl ethers of tetrapropylene glycol, diglycidyl ethers of 1,4-butylene glycol, diglycidyl ethers of 1,5-pentanediol, diglycidyl ethers of 1,6-hexanediol, diglycidyl ethers of cyclohexanedimethanol, di- and triglycidyl ethers of trimethylolpropane, and glycidyl esters of $C_6$- to $C_{24}$-carboxylic acids.

13. The foamable composition of claim 1, wherein dicyanamide is used as at least one of said curatives in a quantity of up to 5 wt. %, based on the total weight of the foamable composition.

14. The foamable composition of claim 1, wherein the one or more blowing agents are selected from the group consisting of azobisisobutyronitrile, azodicarbonamide, di-nitrosopentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide and expandable hollow microspheres.

15. The foamable composition of claim 1, additionally comprising fibers selected from the group consisting of aramid fibers, carbon fibers, metal fibers, glass fibers, polyamide fibers, polyethylene fibers, polyester fibers and mixtures thereof.

16. An injection molded object comprising the foamable composition of claim 1.

17. A foam obtained by heating and curing the foamable composition of claim 1.

18. A composite comprising a solid article and the foam of claim 17.

19. A foamable composition comprising:
  35-60 weight % Epoxy Resin(s);
  3.50-7.00 weight % Polyester(s);
  0.1-5 weight % Rubber(s)/Toughening Agent(s);
  0.1-10 weight % Curing Agent(s)/Catalyst(s);
  0.1-10 weight % Blowing Agent(s); and
  25-50 weight % Filler(s).

20. The foamable composition of claim 19, said one or more polyesters being selected such that said polyesters have a melting point from 50 to 90 degrees C., have a hydroxyl number between 50 and 10 mg KOH/g and have an acid number not exceeding 5 mg KOH/g.

21. The foamable composition of claim 19 in a granular form suitable for use in an injection molding process having a plurality of granules having non-tacky surfaces at room temperature.

22. An expandable, thermally curable molded object produced from the granules of claim 21.

* * * * *